(12) United States Patent
Kuntze

(10) Patent No.: US 7,591,445 B2
(45) Date of Patent: Sep. 22, 2009

(54) RETAINER-PLASTIC TRIM MOLDING

(75) Inventor: Christopher John Kuntze, Clarkston, MI (US)

(73) Assignee: Magna International (CA)

( * ) Notice: Subject to any disclaimer, the term of this patent is extended or adjusted under 35 U.S.C. 154(b) by 297 days.

(21) Appl. No.: 11/638,813

(22) Filed: Dec. 14, 2006

(65) Prior Publication Data

US 2008/0141500 A1 Jun. 19, 2008

(51) Int. Cl.
*A47B 96/00* (2006.01)

(52) U.S. Cl. .............. 248/222.11; 248/226.11; 248/316.7

(58) Field of Classification Search ............ 248/222.11, 248/226.11, 316.7, 300; 24/289, 290, 296, 24/297; 411/553; 52/716.6, 718.04
See application file for complete search history.

(56) References Cited

U.S. PATENT DOCUMENTS

| | | | | |
|---|---|---|---|---|
| 3,113,358 A | * | 12/1963 | Zell et al. ................... | 312/263 |
| 3,548,425 A | * | 12/1970 | Goldstein ..................... | 5/299 |
| 3,858,996 A | * | 1/1975 | Jarvis ......................... | 403/353 |
| 5,467,254 A | * | 11/1995 | Brusati et al. ................ | 361/799 |
| 5,653,550 A | * | 8/1997 | Mutz et al. ................... | 403/329 |
| 5,740,640 A | * | 4/1998 | Yasuda ................... | 52/204.597 |
| 6,070,930 A | * | 6/2000 | Takagi et al. ............. | 296/96.21 |
| 6,123,385 A | * | 9/2000 | Bailey et al. ............. | 296/146.7 |
| 6,315,489 B1 | * | 11/2001 | Watanabe ................... | 403/381 |
| 6,497,395 B1 | * | 12/2002 | Croker ....................... | 248/300 |
| 7,090,426 B2 | * | 8/2006 | Wing ......................... | 403/329 |
| 2006/0213142 A1 | * | 9/2006 | Albracht ..................... | 52/543 |

* cited by examiner

*Primary Examiner*—Korie H. Chan
(74) *Attorney, Agent, or Firm*—Warn Partners, P.C.; Marc Luddy

(57) ABSTRACT

A trim molding assembly including a component having an attachment portion, at least one retainer in which the component and the retainer attach to one another, at least one clip on the retainer, and at least one detent area on the component. The component contacts the retainer clip, such that the attachment portion of the component is placed between the clip and a plurality of surfaces of the retainer. The attachment portion of the component extends through a first detent area and connects a first detent side of the first detent area and a second detent side of the first detent area. The attachment portion has a greater length than the clip such that the component changes positions with respect to the retainer while maintaining the connection between the retainer and the component.

19 Claims, 4 Drawing Sheets

RETAINER-PLASTIC TRIM MOLDING

FIELD OF THE INVENTION

The present invention relates to a trim molding assembly in which a component and a retainer are attached to one another and the component is capable of movement with respect to the retainer.

BACKGROUND OF THE INVENTION

In today's marketplace, vehicle manufacturers are concerned about the appearance of the vehicles and thus vehicles are designed to cover up many of the working components of the vehicle, which otherwise reduces the aesthetics of the vehicle. Therefore, many vehicles today have rocker panels or sight shields which extend along the length of the vehicle underneath the door frames, which cover the components attached on the under carriage of the vehicle from the typical line of sight. These components create a more aesthetic vehicle which is preferred by consumers.

However, rocker panels and sight shields that are difficult or time consuming to securely attach to the vehicle in conjunction with assembly plant restrictions can make for an inefficient manufacturing process. The reason for this is that attachment of the rocker panel and sight shield typically requires the use of several small attachment devices. In addition, it is difficult to attach the rocker panel or sight shield to the vehicle so that it is rigidly retained to the vehicle, and yet the rocker panel or sight shield is allowed to expand and contract with thermal variations without being damaged. For example, rigid bolts which secure the rocker panel or sight shield tightly to the vehicle do not allow it to properly slip or move with respect to the vehicle when thermal expansion or contraction occurs.

Therefore, it is desirable to develop an assembly in which a component, such as a rocker panel or sight shield, is connected to the vehicle by a retainer which allows the component to move with respect to the vehicle due to thermal variations.

SUMMARY OF THE INVENTION

The present invention relates to a trim molding assembly including a component having an attachment portion, at least one retainer in which the component and the retainer attach to one another, at least one clip on the retainer, and at least one detent area on the component. The retainer attaches to the component. The component contacts the retainer at the clip, such that the attachment portion of the component is placed between the clip and a plurality of surfaces of the retainer. The attachment portion of the component extends through a first detent area and connects a first detent side of the first detent area and a second detent side of the first detent area. The attachment portion has a greater length than the clip such that the component changes positions with respect to the retainer while maintaining the connection between the retainer and the component.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
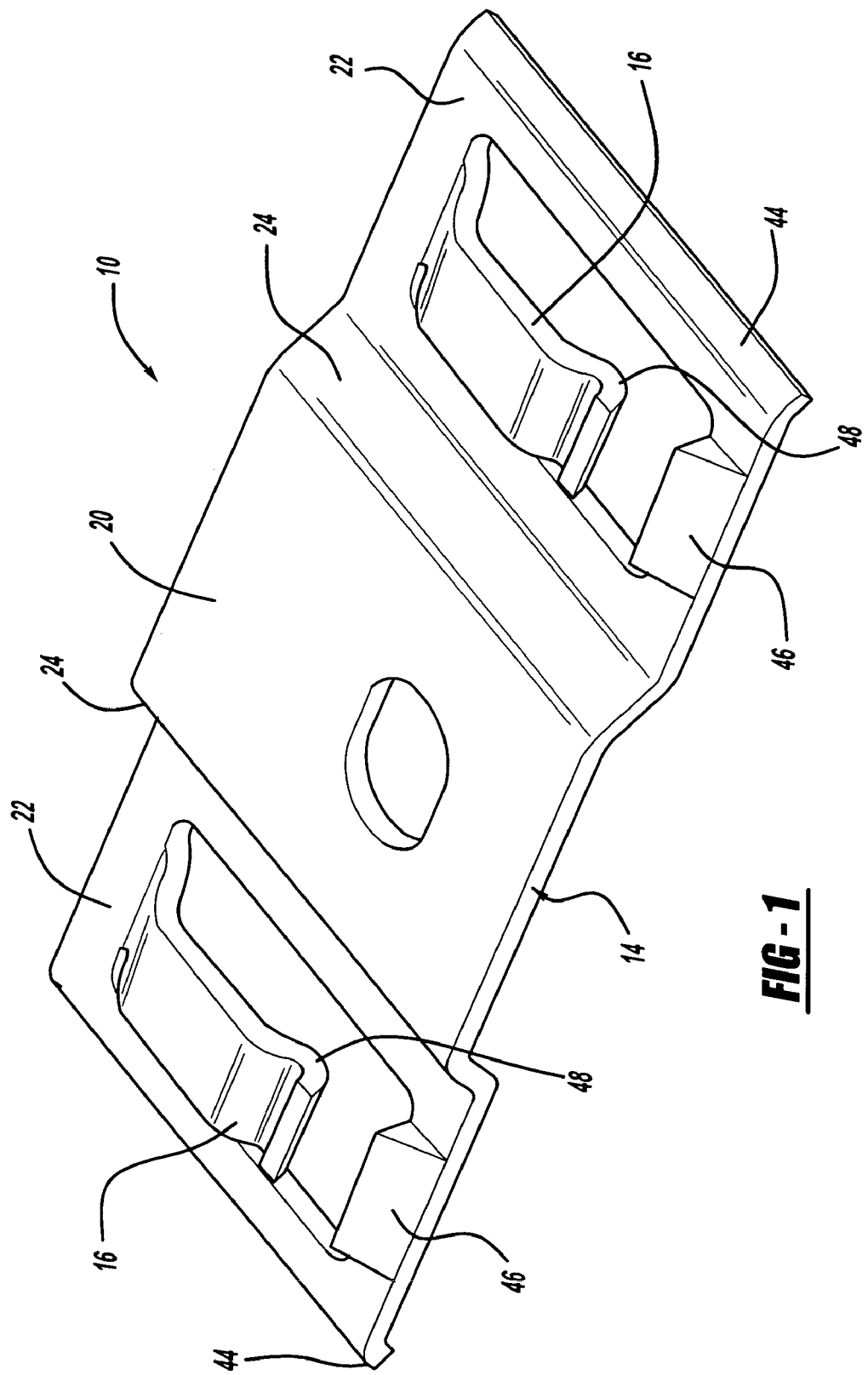
FIG. 1 is a perspective top view of a retainer in accordance with an embodiment of the present invention.

The following description of the preferred embodiment(s) is merely exemplary in nature and is in no way intended to limit the invention, its application, or uses.

Referring to FIGS. 1-4, a trim molding assembly is generally shown at 10. The trim molding assembly 10 includes a component generally indicated at 12, and at least one retainer generally indicated at 14. By way of explanation and not limitation, the component 12 can be a plastic component that is mounted to a motorized vehicle, generally indicated at 15, such as but not limited to, a sight shield, a rocker panel, or the like. Thus, the retainer 14 attaches to the component 12 in order for the component 12 to be ultimately attached to the vehicle 15.

The retainer 14 has at least one clip 16, which is used to attach the retainer 14 to the component 12. The retainer 14 has a plurality of surfaces in which the clip 16 extends from one of the surfaces. The plurality of surfaces of the retainer 14 include at least a first surface 20, a second surface 22, and a third surface 24 which connects the first surface 20 and the second surface 22. The third surface 24 is an angled surface, such that the first surface 20 is at a greater height than the second surface 22. Typically, there are two second surfaces 22 connected to both sides of a single first surface 20 by two angled third surfaces 24. Thus, the clip 16 extends from and across the second surface 22.

The component 12 has an attachment portion 25 which contacts the clip 16 in order to attach the retainer 14 to the component 12. The component 12 has a first detent area 26 in which the attachment portion 25 extends between a first detent side 28 of the first detent area 26 and a second detent side 30 of the first detent area 26. The component 12 has a pair of first detent sides 28, second detent sides 30, and attachment portions 25 so that the component 12 contacts both second surfaces 22 of the clip 16 when the component 12 and the retainer 14 are attached to one another. Additionally, a second detent area 34 is formed in the component 12 between the two second detent sides 30 of the first detent area 26.

When the retainer 14 and the component 12 are attached to one another, the clip 16 extends over the attachment portion 25. The attachment portion 25 can have a greater length between the first detent side 28 and second detent side 30 than the clip 16 in order to allow the component 12 to move with respect to the retainer 14 and the vehicle 15, while maintaining a secure connection between the retainer 14 and component 12.

Figure 2:
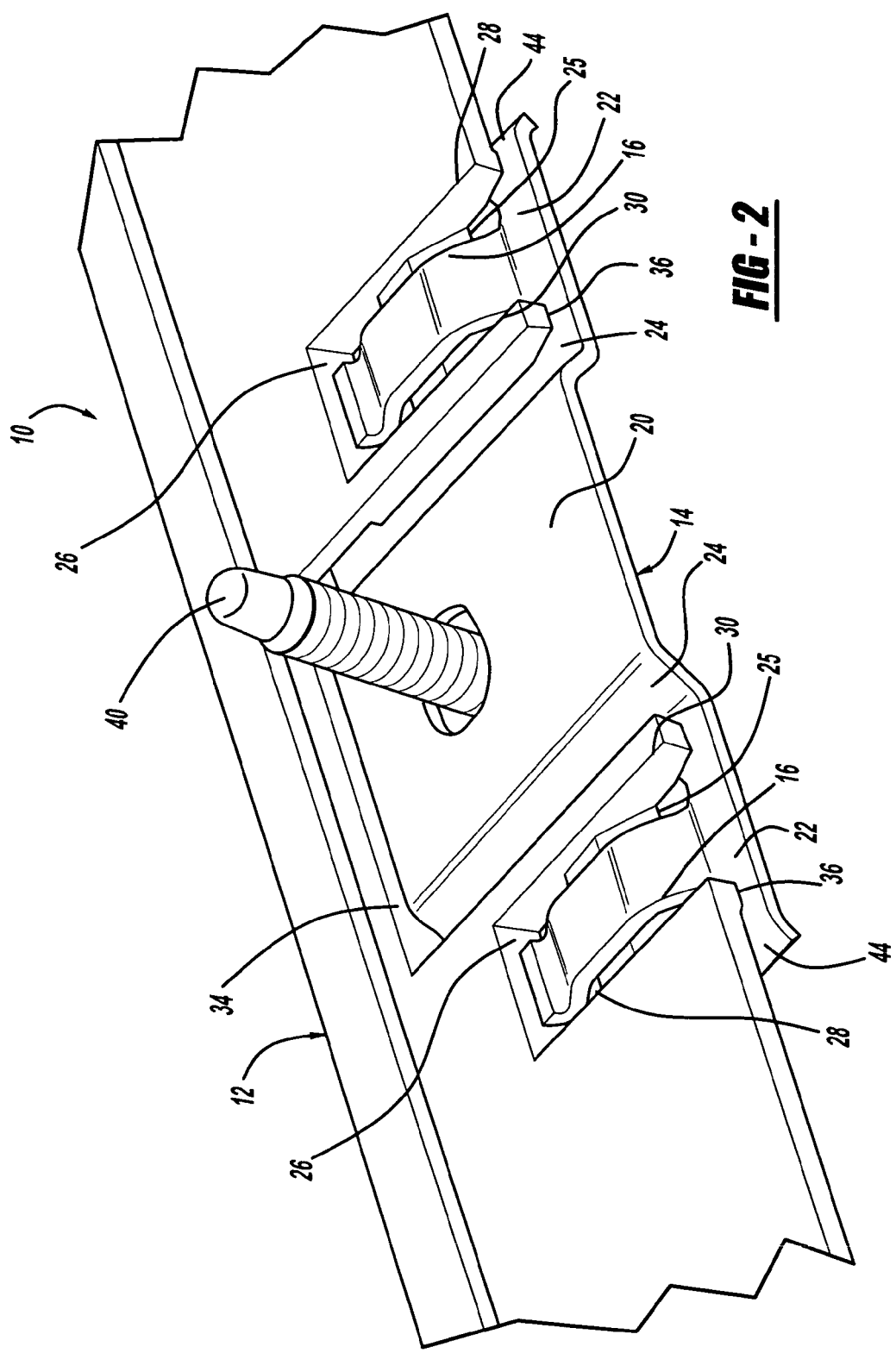
FIG. 2 is a perspective top view of the trim molding assembly in accordance with an embodiment of the present invention.
Figure 3:
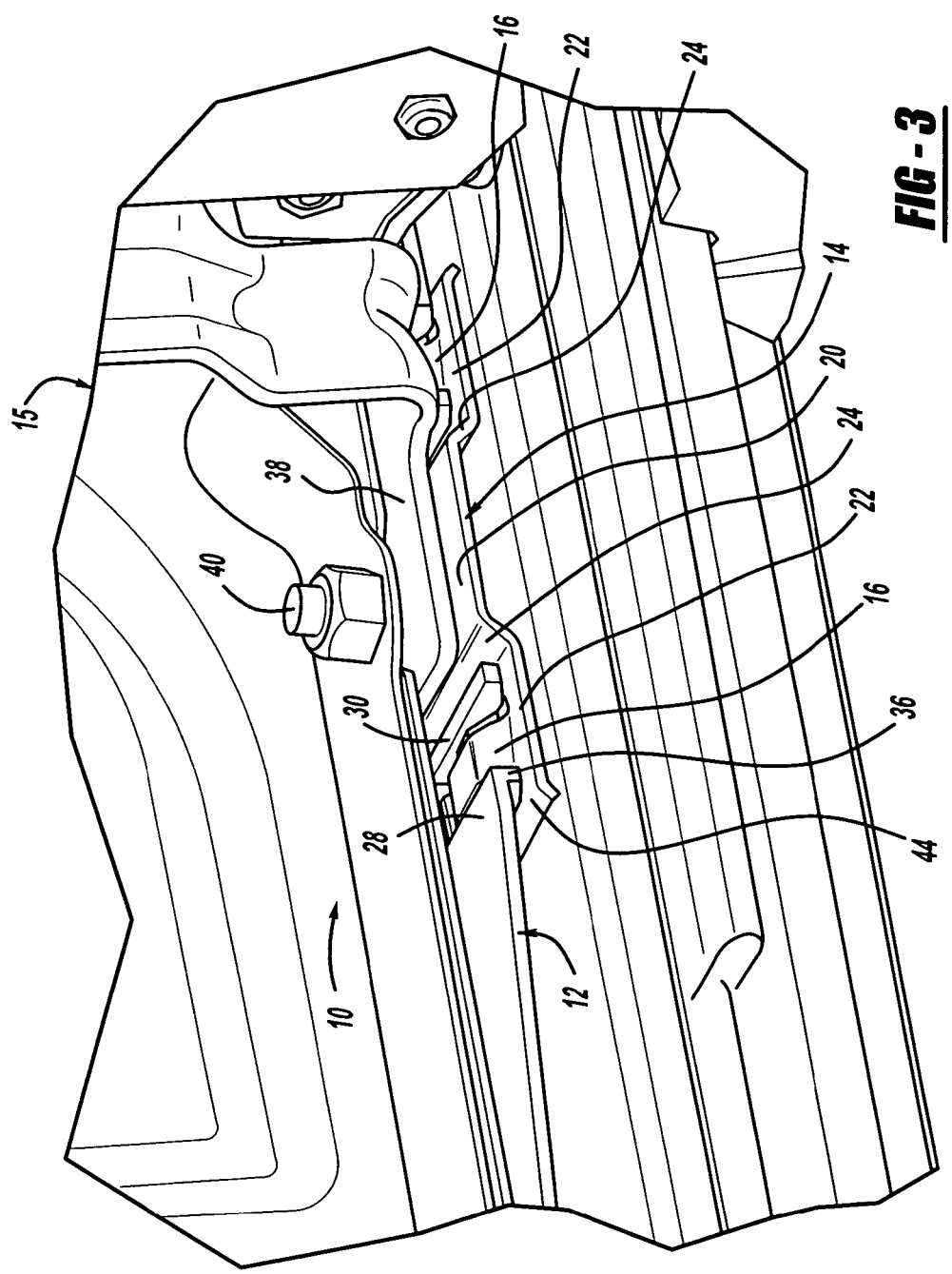
FIG. 3 is an environmental perspective view of the trim molding in accordance with an embodiment of the present invention.

The clip 16 extends from the second surface 22, such that the attachment portion 25 is placed between the clip 16 and the second surface 22 when the component 12 and retainer portion 14 are attached to one another. Thus, the clip 16 can extend from the second surface 22 substantially parallel to the third surface 24. Further, the clip 16 can have an arc shape from the side contacting the second surface 22 to the other end. The arc shape allows the attachment portion 25 to more easily slide under the clip 16 when compared to an attachment portion not having the arc shape. When the component 12 is attached to the retainer 14, the first detent side 28 and second detent side 30 contact the second surface 22 substantially parallel to the third surface 24 (FIGS. 1-3). Thus, the first detent side 28 and second detent side 30 contact the top of the second surface 22 while the attachment portion 25 extends between the second surface 22 and the clip 16. Additionally, the second detent area 34 is approximately the size of the first surface 20 so that when the component 12 and retainer 14 are attached to one another, the first surface 20 is placed in the second detent area 34.

When the component 12 and the retainer 14 are attached to one another, the first surface 20 is approximately even with the top of the second detent side 30. Also, the first detent side 28 has a flange 36 which contacts the retainer 14 so that the top of the first detent side 28 is approximately the same height as the first surface 20 and the top of the second detent side 30. The even surface created by the approximately even heights between the top of the first detent side 28 and the top of the second detent side 30 when the component 12 and the retainer 14 are attached to one another, is to allow for a second component 38 to contact the first surface 20.

An attachment mechanism 40 extends through the first surface 20 and through the second component 38 in order to attach the retainer 14 to the second component 38. By way of explanation and not limitation, the attachment mechanism 40 is any suitable fastener, such as but not limited to, a nut and bolt combination or the like. When the retainer 14 is connected to both the component 12 and the second component 38, the component 12 is ultimately connected to the second component 38. By way of explanation and not limitation, the second component 38 is, but not limited to, the vehicle 15 or a bracket which is ultimately connected to a vehicle 15. Thus, the second component 28 or bracket connects the component 12 through the retainer 14 to the vehicle 15.

Alternatively, the retainer 14 can have a flange 44 that extends from the second surface 22 away from the component 12. Typically, the flange 44 is a rounded surface so that the flange 44 assists the component 12 when the component 12 is moving with respect to the retainer 14 or vehicle 15. Additionally, the flange 44 prevents the retainer 14 from scratching or damaging the component 12. Also, the retainer 14 can have at least one ramp surface. The at least one ramp surface can include a first ramp surface 46 on the second surface 22 in order to guide the attachment portion 25 across the second surface 22 to be placed underneath the clip 16. Thus, the first ramp surface 46 extends from the edge of the second surface 22 on the opposite side of the second surface 22 as the side in which the clip 16 extends from the second surface 22. Further, the retainer 14 can have a second ramp surface 48 on the clip 16 for retaining the component 12. Thus, when the component 12 is placed under the clip 16, the second ramp surface 48 retains the component 12 so that the component 12 does not become detached from the retainer 14 at undesirable times.

By way of explanation and not limitation, the component 12 can be a rocker panel or sight shield that is connected to a lower portion of the vehicle 15 in order to cover components of the vehicle 15 in order to make a more aesthetically pleasing vehicle 15. Thus, the component 12 can be plastic molded or thermoformed with the exterior side of the component 12 being a Class "A" finish to comply with the standards of an exterior surface by OEMs. Typically, the retainer 14 is made of a plastic material, a composite material, or a metal that has sufficient strength characteristics in order to support the component 12. By manufacturing the component 12 and the retainer 14 of a plastic material or a composite material, the component 12 and retainer 14 are lighter when compared to other materials, which is beneficial in order to minimize the overall weight of the vehicle 15. However, the component 12 and retainer 14 can be made of any materials which are adequate to support the forces that are applied to the component 12 and the retainer 14 and comply with any OEM's specifications.

Figure 4:
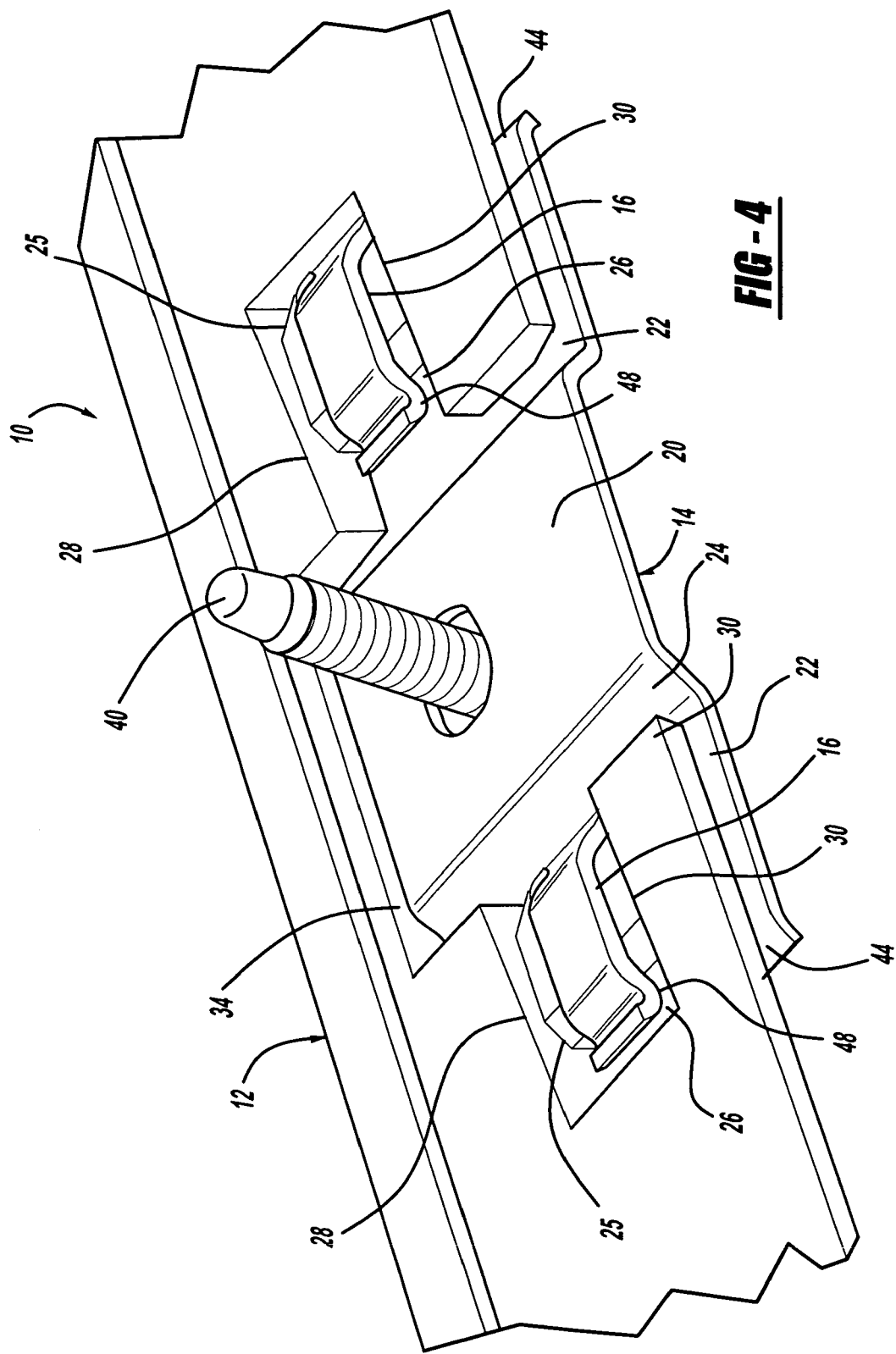
FIG. 4 is a perspective top view of the trim molding assembly in accordance with an embodiment of the present invention.

Referring to FIG. 4, in an alternate embodiment, the clip 16 extends from the second surface 22, so that the clip 16 can be substantially perpendicular to the third surface 24. Thus, the clip 16 extends away from the third surface 24 towards the flange 36. Similarly, the first detent side 28 and second detent side 30 still create the first detent area 26; however, when the first detent side 28 and second detent side 30 contacts the second surface 22, the first detent side 28 and second detent side 30 are perpendicular to the third surface 24.

Referring to FIGS. 1-4, by way of explanation and not limitation, the trim molding assembly 10 includes the component 12 and retainer 14 being separately manufactured, and the component 12 and retainer 14 then being attached to one another. After that, the component 12 and retainer 14 are connected to the second component 38 by the attachment mechanism 40. Thus, the component 12 and retainer 14 are attached to one another and then shipped to a second manufacturer which connects the trim molding assembly 10 to the second component 38. Therefore, the first manufacturer slides the retainer 14 into the detent areas 26, 34 of the component 12 in order to attach the component 12 and retainer 14. Then the second manufacturer places the attachment mechanism 40 through the first surface 20 and into the second component 38.

By way of explanation and not limitation, the second component 38 can be a bracket attached to the vehicle 15 so that the component 12 is ultimately connected to the vehicle 15. However, due to the connection of the component 12 and the retainer 14, the component 12 is capable of moving with respect to the retainer 14 or the vehicle 15. Thus, the placement of the attachment mechanism 25 between the clip 16 and the second surface 22 allows the component 12 to move with respect to the retainer 14 or the vehicle 15. Since the attachment portion 25 has a length greater than the clip 16, the attachment mechanism 25 changes positions with respect to the clip 16 so that a different portion of the attachment mechanism 25 is between the clip 16 and the second surface 22 when the component 12 moves. By way of explanation and not limitation, the component 12 can be moved due to thermal variations which cause the component 12 and other components attached to the vehicle 15 to change in size and thus force the component 12 to different positions. In hot temperatures, the component 12 and other elements expand which causes the component 12 to move with respect to the retainer 14 or the vehicle 15. By having the clip 16 connect to a larger attachment portion 25, the component 12 Is able to move due to thermal variations while still being secured to the vehicle 15. Therefore, damage to the component 12 and other elements is prevented due to the free movement capabilities of the component 12.

The number of retainers 14 that are attached to the component 12 is dependent upon the size or length of the component 12. Thus, the longer the length of the component 12 is, the more retainers 14 that are needed to adequately secure the component 12 to the vehicle 15. The retainers 14 are placed along the component 12 at a desired distance between the retainers 14 in order to prevent the component 12 from sagging and to provide the component 12 with an adequate amount of support from the vehicle 15.

The length of the attachment portion 25 is dependent upon the length of the component 12. For example, the longer the length of the component 12, the more expansion and contraction the component 12 will typically undergo during thermal variations. Due to the increased expansions and contractions of the component 12, the component 12 will move more with respect to the retainer 14 and the vehicle 15. Thus, a larger attachment portion 25 is needed to accommodate the movement of the component 12. Likewise, if the component 12 is shorter and made of less material, the component 12 will typically expand and contract less due to thermal variations. In this situation, the attachment portion 25 has a shorter length between the first detent side 28 and the second detent side 30 in order to accommodate the movement of the component 12.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A trim molding assembly comprising:
   a component having an attachment portion;
   at least one retainer, wherein said component and said at least one retainer attach to one another;
   at least one clip on said at least one retainer, wherein said component contacts said at least one retainer at said at least one clip, such that said attachment portion of said component is placed between said at least one clip and a plurality of surfaces of said retainer, wherein said plurality of surfaces including a first surface and a second surface are connected by a third surface, such that said third surface is an angled surface and said first surface and said second surface are at different heights with respect to one another; and
   at least one detent area on said component, wherein said attachment portion of said component extends through a first detent area and connects a first detent side of said first detent area and a second detent side of said first detent area, and said attachment portion has a greater length than said at least one clip such that said component changes positions with respect to said at least one retainer while maintaining the connection between said at least one retainer and said component.

2. The trim molding assembly of claim 1, wherein said clip extends from said second surface, such that said attachment portion is placed between said clip and said second surface.

3. The trim molding assembly of claim 1, wherein said clip extends from said second surface substantially parallel to said third surface, and said first detent side and said second detent side contact said second surface substantially parallel to said third surface.

4. The trim molding assembly of claim 1, wherein said clip extends from said second surface substantially perpendicular to said third surface, and said first detent side and said second detent side of contact said second surface substantially perpendicular to said third surface.

5. The trim molding assembly of claim 1, wherein when said component is attached to said retainer, said first surface is approximately even with a top surface of said second detent side, and said first surface is placed in a second detent area which is formed by said second detent sides of said first detent area such that there is said first detent area on both sides of said second detent area.

6. The trim molding assembly of claim 1, wherein said first detent side has a flange that extends towards said clip, such that said flange contacts said clip and a top surface of said first side is at a greater height than said clip.

7. The trim molding assembly of claim 1, wherein an attachment mechanism extends through said first surface in order to attach said retainer to a second component.

8. The trim molding assembly of claim 1, wherein an end of said second surface opposite said third surface has a flange that extends away from said component in order to guide said component when moving with respect to said retainer.

9. The trim molding assembly of claim 1, wherein the position of said component is altered with respect to said retainer due to thermal variations of said component.

10. The trim molding assembly of claim 1, wherein said retainer has at least a first ramp surface and a second ramp surface, such that said attachment portion of said component slides along said first ramp surface when being placed under said clip, and said second ramp surface is on said clip for retaining said component.

11. A trim molding assembly comprising:
    a component having an attachment portion;
    at least one retainer, wherein said component and said at least one retainer attach to one another;
    a plurality of surfaces on said at least one retainer, wherein a first surface and a second surface are connected by a third surface, such that said third surface is an angled surface and said first surface and said second surface are at different heights with respect to one another;
    at least one clip that extends from said second surface substantially parallel to said third surface, wherein said component attaches to said at least one retainer at said at least one clip such that said attachment portion of said component is placed between said at least one clip and said second surface; and
    a plurality of detent areas on said component, wherein said attachment portion of said component extends through a first detent area and connects a first detent side of said first detent area and a second side of said first detent area, said first surface is placed in a second detent area which is formed by said second detent sides so that there is said first detent area on both sides of said second detent area, and said attachment area has a greater length than said at least one clip such that said component changes positions with respect to said at least one retainer while maintaining the connection between said at least one retainer and said component.

12. The trim molding assembly of claim 11, wherein an attachment mechanism extends through said first surface in order to attach said retainer to a second component.

13. The trim molding assembly of claim 11, wherein an end of said second surface opposite said third surface has a flange that extends away from said component in order to guide said component when moving with respect to said retainer.

14. The trim molding assembly of claim 11, wherein the position of said component is altered with respect to said retainer due to thermal variations of said component.

15. The trim molding assembly of claim 11, wherein said retainer has at least a first ramp surface and a second ramp surface, such that said attachment portion of said component slides along said first ramp surface when being placed under said clip, and said second ramp surface is said clip for retaining said component.

16. A trim molding assembly comprising:

a component having an attachment portion;

at least one retainer, wherein said component and said at least one retainer attach to one another;

a plurality of surfaces on said at least one retainer, wherein a first surface and a second surface are connected by a third surface, such that said third surface is an angled surface and said first surface and said second surface are at different heights with respect to one another;

at least one clip that extends from said second surface substantially perpendicular to said third surface, wherein said component attaches to said at least one retainer at said at least one clip such that said attachment portion of said component is placed between said at least one clip and said second surface;

an attachment mechanism extending through said first surface, wherein said attachment mechanism connects said at least one retainer to a second component;

a plurality of detent areas on said component, wherein said attachment portion of said component extends through a first detent area and connects a first detent side of said first detent area and a second detent side of said first detent area, said first surface is placed in a second detent area which is formed by said second sides of said first detent areas so that there is said first detent area on both sides of said second detent area, and said attachment area has a greater length than said at least one clip such that said component changes positions with respect to said at least one clip due to thermal variations while maintaining the connection between said at least one retainer and said component; and a flange extending from an end of said second surface opposite said third surface, wherein said flange extends away from said component in order to guide said component when moving with respect to said clip.

17. The trim molding assembly of claim 16, wherein said first detent side and said second detent side contact said second surface substantially perpendicular to said third surface.

18. The trim molding assembly of claim 16, wherein the position of said component is altered with respect to said retainer due to thermal variations of said component.

19. The trim molding assembly of claim 16, wherein said retainer has at least a first ramp surface and a second ramp surface, such that said attachment portion of said component slides along said first ramp surface when being placed under said clip, and said second ramp surface on said clip for retaining said component.

* * * * *